(12) United States Patent
Lee et al.

(10) Patent No.: US 11,728,735 B2
(45) Date of Patent: Aug. 15, 2023

(54) CONVERTER USING PLANAR TRANSFORMER

(71) Applicants: HYUNDAI MOTOR COMPANY, Seoul (KR); KIA MOTORS CORPORATION, Seoul (KR)

(72) Inventors: Dae Woo Lee, Incheon (KR); Byung Gu Kang, Daegu (KR); Tae Jong Ha, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 315 days.

(21) Appl. No.: 17/085,658

(22) Filed: Oct. 30, 2020

(65) Prior Publication Data
US 2022/0014103 A1 Jan. 13, 2022

(30) Foreign Application Priority Data
Jul. 13, 2020 (KR) .................. 10-2020-0086377

(51) Int. Cl.
*H02M 3/158* (2006.01)
*H01F 27/28* (2006.01)

(52) U.S. Cl.
CPC ...... *H02M 3/1588* (2013.01); *H01F 27/2804* (2013.01); *H01F 2027/2809* (2013.01); *H01F 2027/2819* (2013.01)

(58) Field of Classification Search
CPC .............. H02M 3/1588; H01F 27/2804; H01F 2027/2809; H01F 2027/2819
USPC ....................................................... 323/282
See application file for complete search history.

(56) References Cited

U.S. PATENT DOCUMENTS 5,684,678 A * 11/1997 Barrett ................ H02M 3/3376
363/17
10,276,084 B2 4/2019 Chun et al.
(Continued)

FOREIGN PATENT DOCUMENTS

GB 2517015 A * 2/2015 ............. G01R 31/14
GB 2517015 A 2/2016
(Continued)

OTHER PUBLICATIONS

European Search Report for European Application No. EP 20 20 5656 dated Apr. 13, 2021 (8 pgs).
(Continued)

*Primary Examiner* — Yemane Mehari
(74) *Attorney, Agent, or Firm* — Morgan, Lewis & Bockius LLP

(57) ABSTRACT

A converter using a planar transformer includes an input device that receives a first voltage, a transformer including a first planar transformer and a second planar transformer that reduce the first voltage, and an output device that outputs the first voltage as a second voltage, wherein the first voltage is greater than the second voltage, and the input device provides a current to a primary winding coil of each of the first planar transformer and the second planar transformer through a first current path and a second current path in which current directions are different with each other, and includes a plurality of inductors connected in parallel with the primary winding coil of each of the first planar transformer and the second planar transformer.

8 Claims, 6 Drawing Sheets

(56) References Cited

U.S. PATENT DOCUMENTS

2006/0279394 A1* 12/2006 Estrov ................ H01F 27/2804
336/200
2018/0130398 A1    5/2018 Chun et al.

FOREIGN PATENT DOCUMENTS

KR         10-1988089         6/2019
WO     WO-2005122377 A1 * 12/2005   ......... H01F 27/2804

OTHER PUBLICATIONS

Liu Yu-Chen et al: "Design and Implementation of a High Power Density Active-Clamped Flyback Converter" 2018 International Power Electronics Conference (IPEC—Niigata 2018—ECCE Asia), IEEJ Industry Application Society, May 20, 2018, pp. 2092-2096.
Vijaya Kumar N. et al: "Analysis and Design Methodology for Planar Transformer with Low Self-Capacitance Used in High Voltage Flyback Charging Circuit", 2016 IEEE International Conference on Power Electornics, Drives and Energy Sysems (PEDES), IEEE, Dec. 14, 2016, pp. 1-5.
Communication pursuant to Article 94(3) EPC issued in corresponding European Patent Application No. 20 205 656.0 dated Jan. 24, 2023.
Luo Fang Lin et al., "DC/DC Conversion Technique and Twelve Series Luo-converters", Jan. 1, 2011, Elsevier/SH, Butterworth-Heinemann, Amsterdam [u.a.], XP093014091.
Byoung-Hee Lee et al., "Active-Clamp Forward Converter With Asymmetric Transformer Turns For Reducing Transformer DC Offset Current", Dec. 30, 2012, XP093014039.

* cited by examiner

CONVERTER USING PLANAR TRANSFORMER

CROSS-REFERENCE TO RELATED APPLICATION

This application claims priority to and the benefit of Korean Patent Application No. 10-2020-0086377, filed on Jul. 13, 2020, the entire contents of which are incorporated herein by reference.

TECHNICAL FIELD

The present disclosure relates to a DC-DC converter using a planar transformer.

BACKGROUND

In recent years, in response to the crisis of air pollution and oil depletion, technologies related to eco-friendly vehicles that use electric energy as vehicle power have been actively developed. The eco-friendly vehicles include hybrid electric vehicles, fuel cell electric vehicles, and electric vehicles.

The eco-friendly vehicles include a high voltage battery for driving a vehicle and a low voltage battery for driving electrical equipment. The electric energy charged in the high voltage battery is used as a power source for the vehicle, and the electric energy charged in the low voltage battery is used as the power source for the electrical equipment in the vehicle.

Since the rate of using the electric energy in general vehicles as well as eco-friendly vehicles is increasing, a development of a converter that stably supplies the electric energy and has good power conversion efficiency may be desired.

SUMMARY

An aspect of the present disclosure provides a converter using a planar transformer.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a converter using a planar transformer includes an input device that receives a high voltage, a transformer including a first planar transformer and a second planar transformer that reduce a voltage provided from the input device, and an output device that outputs a voltage that is reduced by the transformer as a low voltage, and the input device provides a current to a primary winding coil of each of the first planar transformer and the second planar transformer through a first current path and a second current path in which current directions are different with each other, and includes a plurality of inductors connected in parallel with the primary winding coil of each of the first planar transformer and the second planar transformer.

DRAWINGS

In order that the disclosure may be well understood, there will now be described various forms thereof, given by way of example, reference being made to the accompanying drawings, in which.

DETAILED DESCRIPTION

Figure 1:
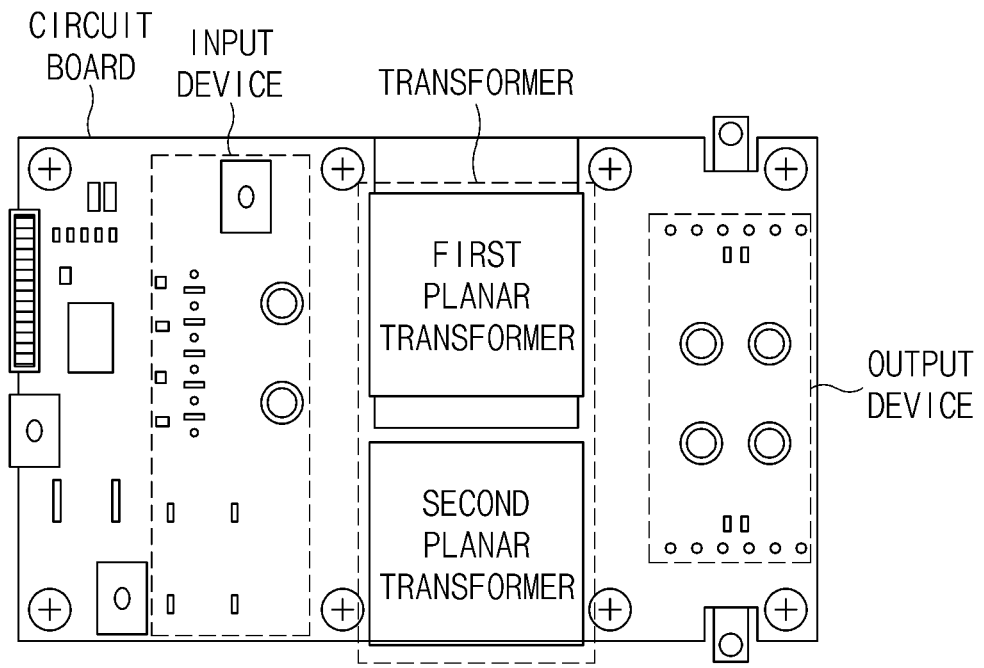
FIG. 1 is a diagram illustrating an actual configuration of a converter in one form of the present disclosure.

Hereinafter, some embodiments of the present disclosure will be described in detail through exemplary drawings. In adding reference numerals to elements of each drawing, it should be noted that the same elements are assigned the same numerals as possible even if they are indicated on different drawings. In addition, in describing an embodiment of the present disclosure, if it is determined that a detailed description of a related known configuration or function obstructs an understanding of the embodiment of the present disclosure, a detailed description thereof will be omitted.

In describing the elements of the embodiments of the present disclosure, terms such as first, second, A, B, (a), (b), etc. may be used. These terms are only for distinguishing the element from other elements, and the nature, order, or order of the element is not limited by the term. In addition, unless otherwise defined, all terms used herein, including technical or scientific terms, have the same meaning as commonly understood by one of ordinary skill in the art to which the present disclosure belongs. Tams such as those defined in a commonly used dictionary should be interpreted as having a meaning consistent with the meaning in the context of the related technology, and should not be interpreted as an ideal or excessively formal meaning unless explicitly defined in this application.

Hereinafter, embodiments of the present disclosure will be described in detail with reference to FIGS. 1 to 3.

FIG. 1 is a diagram illustrating an actual configuration of a converter in some forms of the present disclosure.

Referring to FIG. 1, a converter according to an embodiment of the present disclosure may be implemented inside a vehicle. In this case, a converter may be integrally formed with the internal control units of the vehicle, and may be implemented as a separate device and may be connected to control units of the vehicle by separate connection means.

Referring to FIG. 1, a converter according to an embodiment of the present disclosure may include a circuit board, an input device, a transformer, and an output device.

The input device, the transformer, and the output device may be mounted on the circuit board.

The input device may receive a high voltage and may transfer the received high voltage to the transformer. In this case, the input device may reduce and transfer a noise component included in the high voltage when the high voltage is transferred to the transformer.

The transformer may convert the high voltage to a low voltage by lowering the voltage level of the high voltage transferred from the input device.

The transformer may include a first planar transformer and a second planar transformer, and the first planar transformer and the second planar transformer may convert the high voltage to the low voltage by lowering the voltage level of the high voltage.

The output device may transfer a low voltage of which voltage level is lowered through the transformer to an external circuit (electrical equipment). In this case, the output device may reduce a noise component included in the low voltage provided from the transformer and may output the low voltage with the reduced noise.

In this case, both the high voltage input to the input device and the low voltage output from the output device may be a direct current (DC) voltage.

Figure 2:
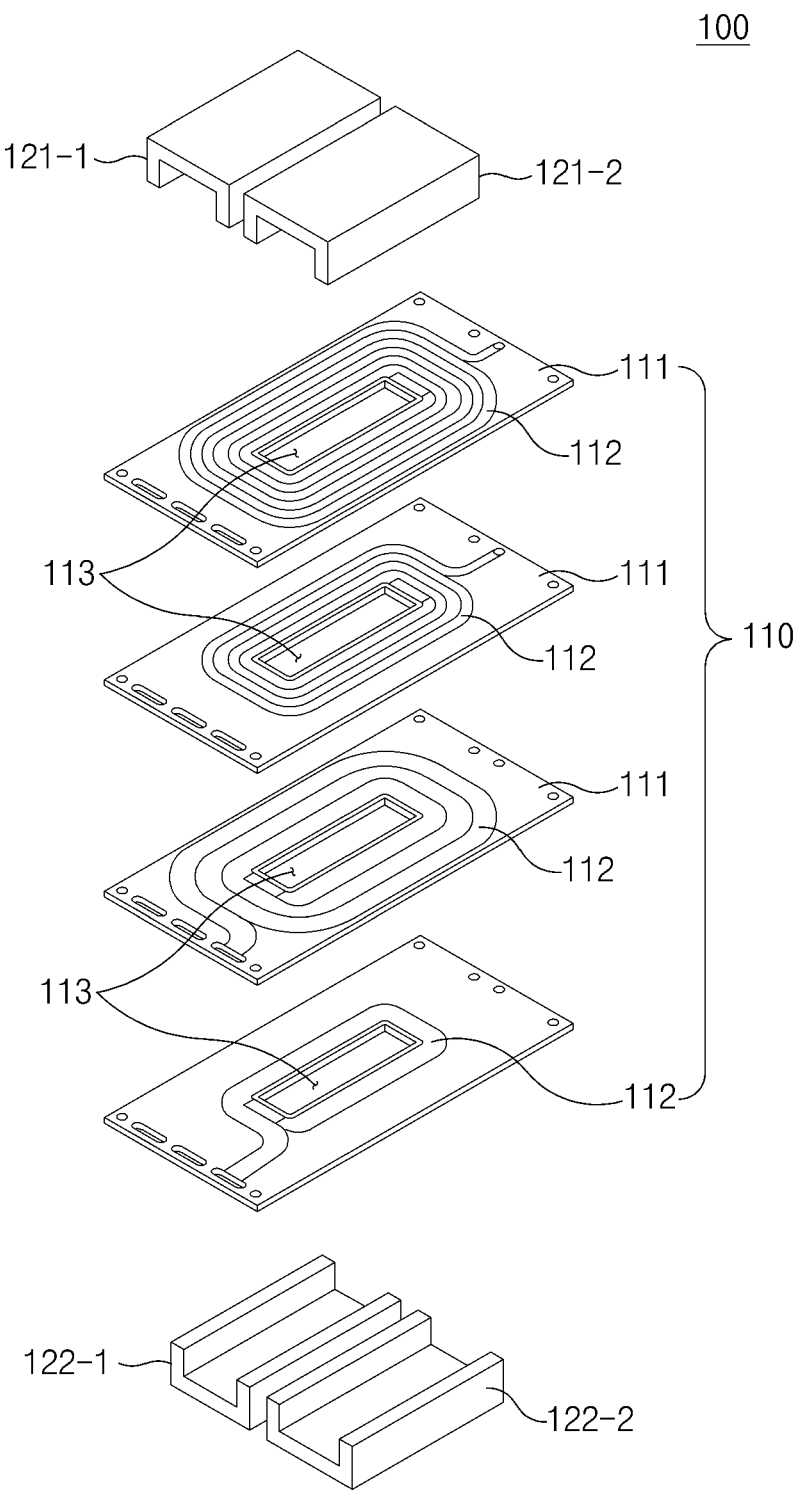
FIGS. 2 and 3 are diagrams illustrating a configuration of a planar transformer.

FIG. 2 is a diagram illustrating a configuration of a transformer.

A transformer 100 may include a multilayer circuit board 110, a first upper core 121-1, a second upper core 121-2, a first lower core 122-1, and a second lower core 122-2.

The multilayer circuit board 110 may include a plurality of printed circuit boards 111.

Each of the plurality of printed circuit boards 111 may have a winding 112 with a preset pattern.

The printed circuit board 111 may be formed of an isolator such as an epoxy.

The winding 112 may have a preset pattern formed on one surface of the printed circuit board 111, and may form a magnetic path that generates an electromagnetic induction.

In this case, the winding 112 may be implemented with a metal foil such as a copper foil, a silver foil, or an aluminum foil made of a conductive material, or a conductive paste such as ink in which metal oxides are dispersed, to form the magnetic path.

The winding 112 may be formed on each printed circuit board 111 in a spiral pattern centered on a central opening 113.

The winding 112 famed on each printed circuit board 111 may have a different number of turns.

The central opening 113 through which one leg of each of the first and second lower cores 122-1 and 122-2 may pass may be formed in each printed circuit board 111.

The first and second upper cores 121-1 and 121-2 and the first and second lower cores 122-1 and 122-2 may be coupled in a form surrounding an outside centering on the central opening 113 of the multilayer circuit board 110.

Each of the first and second upper cores 121-1 and 121-2 and the first and second lower cores 122-1 and 122-2 may be implemented as a magnetic material having magnetic properties.

In the transformer 100 configured as described above, a transformation ratio may be determined based on the number of turns of the winding 112 formed on each printed circuit board 111.

Figure 3:
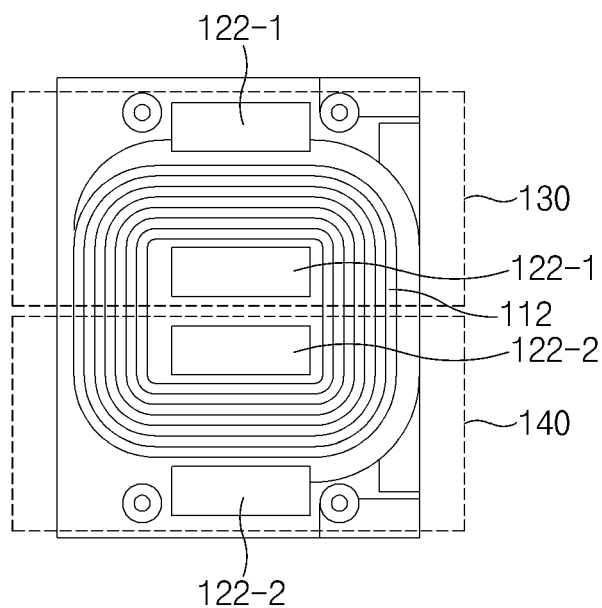

FIG. 3 is a diagram illustrating first and second planer transformers 130 and 140 included in a transformer illustrated in FIG. 2.

The first planar transformer 130 may include the first upper core 121-1, the first lower core 122-1, and the winding 112 between legs of the first lower core 122-1.

The second planar transformer 140 may include the second upper core 121-2, the second lower core 122-2, and the winding 122 between legs of the second lower core 122-2.

Figure 4:
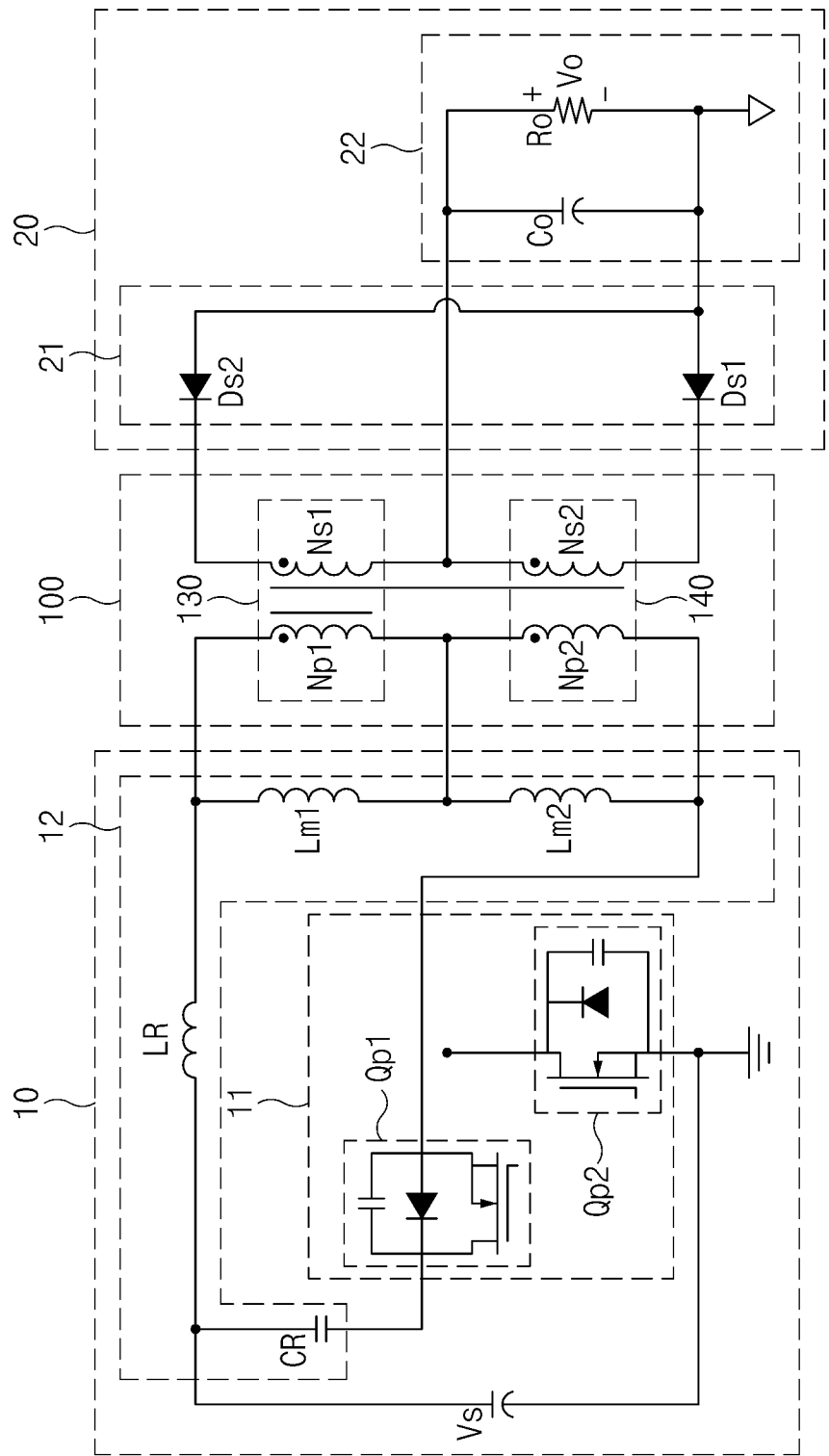
FIG. 4 is a circuit diagram illustrating a converter in one form of the present disclosure.

FIG. 4 is a circuit diagram illustrating a converter in some forms of the present disclosure.

Referring to FIG. 4, a converter according to the embodiment of the present disclosure may include an input device 10, the transformer 100, and an output device 20.

The input device 10 may transfer a high voltage as an input voltage VS to the transformer 100.

The input device 10 may include a switching device 11 and an input regulator 12.

The switching device 11 may include a first switch Qp1 and a second switch Qp2.

In this case, the first and second switches Qp1 and Qp2 may be alternately turned on. A current path of the input device 10 may be determined by the first and second switches Qp1 and Qp2 that are alternately turned on.

For example, when the first switch Qp1 is turned on, a current may be provided to the transformer 100 through a first current path, and when the second switch Qp2 is turned on, a current may be provided to the transformer 100 through a second current path.

The input regulator 12 may include a first capacitor CR, a first inductor LR, a second inductor Lm1, and a third inductor Lm2, and may remove noise from the current provided to the transformer 100.

The transformer 100 may reduce the high voltage transferred from the input device 10 and may transfer the reduced voltage to the output device 20.

The transformer 100 may include the first planar transformer 130 and the second planar transformer 140.

When the first and second planar transformers 130 and 140 are represented in a circuit diagram, they may be illustrated as primary winding coils Np1 and Np2 and secondary winding coils Ns1 and Ns2.

The first planar transformer 130 may be illustrated as the primary winding coil Np1 and the secondary winding coil Ns1.

Both ends of the primary winding coil Np1 of the first planar transformer 130 may be connected to both ends of the second inductor Lm1, respectively.

The second planar transformer 140 may be illustrated as the primary winding coil Np2 and the secondary winding coil Ns2.

Both ends of the primary winding coil Np2 of the second planar transformer 140 may be connected to both ends of the third inductor Lm2, respectively.

The output device 20 may transfer a voltage (the low voltage) transformed by the transformer 100 to the external circuit (the electrical equipment).

The output device 20 may include a rectifier 21 and a filter 22.

The rectifier 21 may include a first diode Ds1 and a second diode Ds2, and may convert a voltage provided from the transformer 100 into the DC voltage In more detail, the first and second diodes Ds1 and Ds2 included in the rectifier 21 may generate the DC voltage by flowing the current generated by the induced electromotive force that are generated in the secondary winding coils Ns1 and Ns2 of the first and second planar transformers 130 and 140 in one direction.

The filter 22 may include a second capacitor Co and a resistor Ro, and may output an output voltage Vo by removing noise of the DC voltage provided from the rectifier 21.

The operation of the converter according to the embodiment of the present disclosure configured as described above will be described with reference to FIGS. 5A and 5B as follows.

Figure 5A:
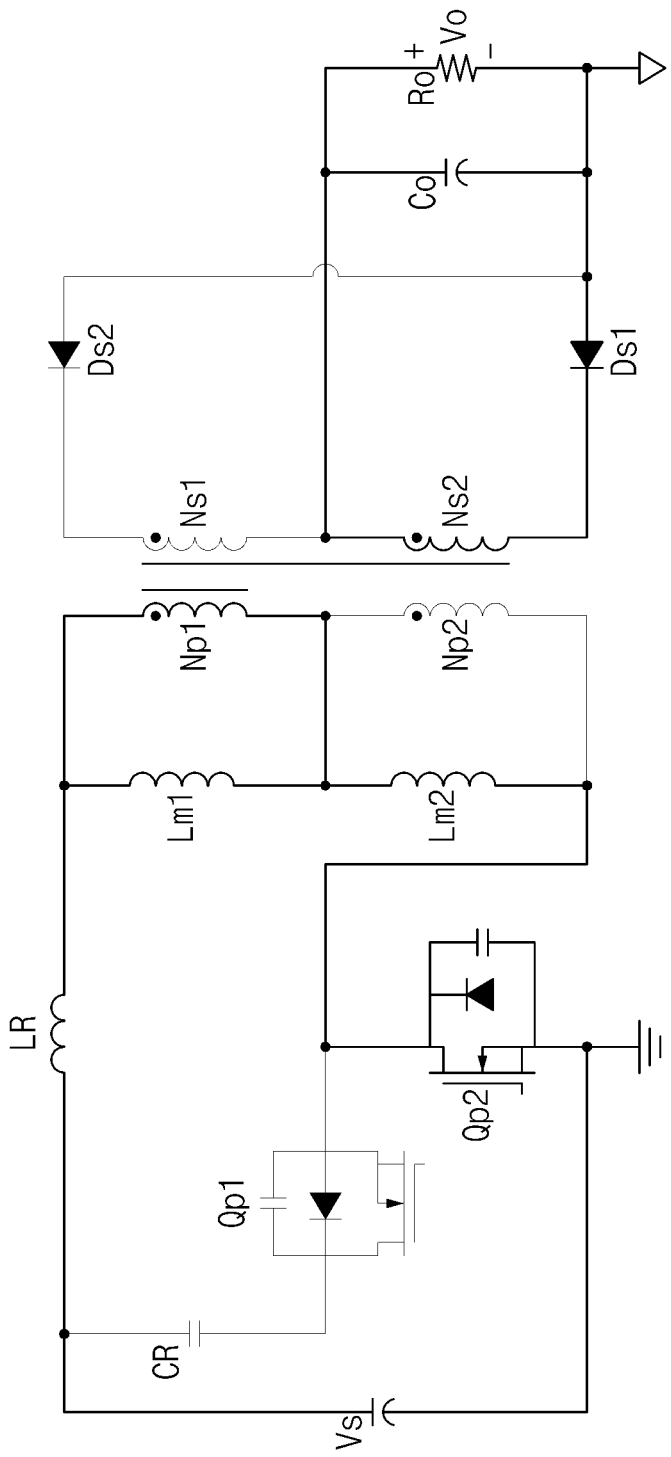
FIGS. 5A and 5B are diagrams describing an operation of a converter in one form of the present disclosure.

In FIG. 5A, when the second switch Qp2 is turned on, the current path sequentially passing through the first inductor LR, the second inductor Lm1, the third inductor Lm2, and the second switch Qp2 may be formed.

In this case, a current may flow through the primary winding coil Np1 of the first planar transformer 130.

When the current flows through the primary winding coil Np1 of the first planar transformer 130, a magnetic flux is generated, and the induced electromotive force may be generated in the secondary winding coil Ns2 of the second planar transformer 140.

The induced electromotive force that is generated in the secondary winding coil Ns2 of the second planar transformer 140 may generate a current that flows through the first diode Ds1, the second capacitor Co, and the resistor Ro.

In this case, the voltage Vo may be output from both ends of the resistor Ro through which the current flows.

Figure 5B:
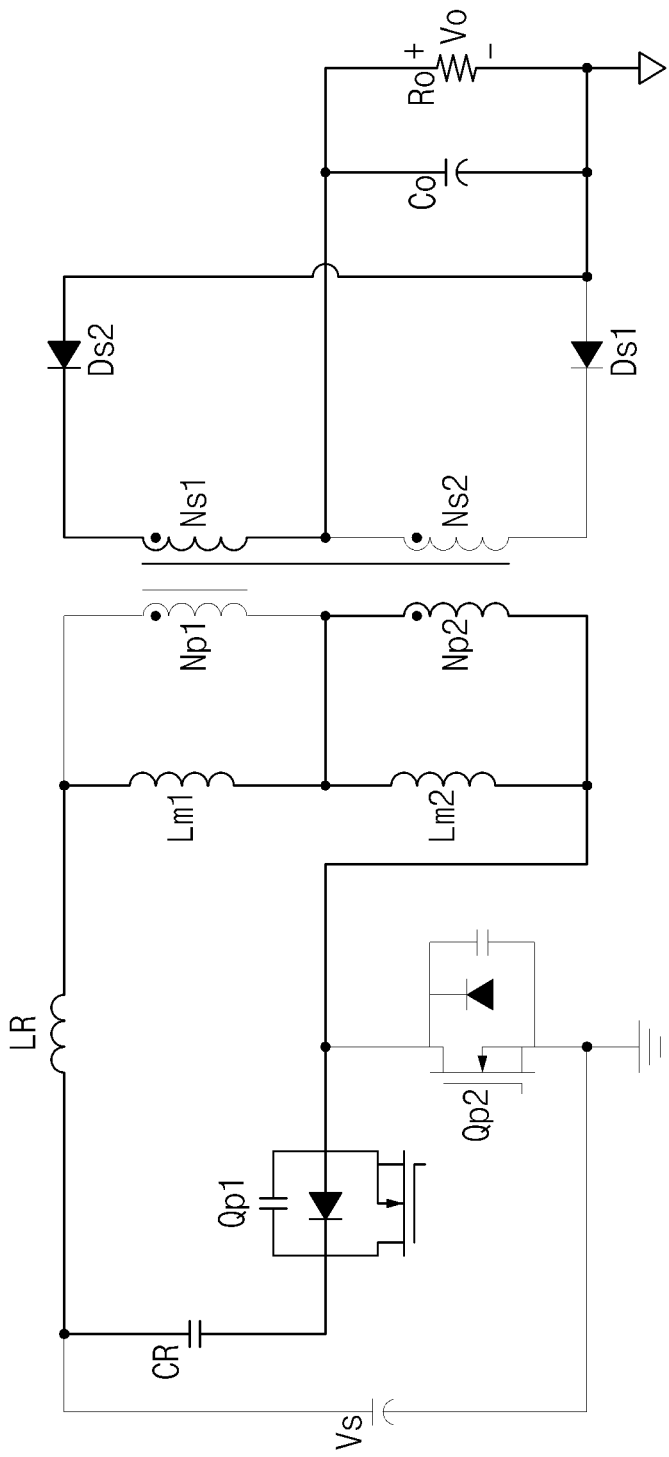

Meanwhile, in FIG. 5B, when the first switch Qp1 is turned on, a current path sequentially passing through the third inductor Lm2, the second inductor Lm1, the first inductor LR, the first capacitor CR, and the first switch Qp1 may be formed.

In this case, a current may flow through the primary winding coil Np2 of the second planar transformer 140.

When the current flows through the primary winding coil Np2 of the second planar transformer 140, a magnetic flux is generated, and the induced electromotive force may be generated in the secondary winding coil Ns1 of the first planar transformer 130.

The induced electromotive force that is generated in the secondary winding coil Ns1 of the first planar transformer 130 may generate a current that flows through the second diode Ds2, the second capacitor Co, and the resistor Ro.

In this case, the voltage Vo may be output from both ends of the resistor Ro through which the current flows.

Even though the first and second switches Qp1 and Qp2 are alternately turned on and the current path direction of the input device 10 is changed, as the current flows in only one direction from a top to a bottom of the resistor Ro in the output device 20, the DC voltage may be outputted at both ends of the resistor Ro.

In addition, the high voltage input from the input device 10 may be reduced to the low voltage depending on the turns ratio of the primary winding coils Np1 and Np2 and the secondary winding coils Ns1 and Ns2 of each of the first and second planar transformers 130 and 140 and may be transferred to the external circuit (the electrical equipment) through the output device 20.

That is, a converter according to an embodiment of the present disclosure may reduce the DC voltage having the high voltage to the DC voltage having the low voltage and may output the reduced DC voltage.

Referring to FIGS. 5A and 5B, in a converter according to an embodiment of the present disclosure, even though the first and second switches Qp1 and Qp2 are alternately turned on and the current path direction of the input device 10 is changed, the current passes through all of the first to third inductors LR, Lm1, and Lm2, thereby removing noise from the current flowing through the primary winding coils Np1 and Np2 of the first and second planar transformers 130 and 140.

Therefore, since the current provided from the input device 10 to the transformer 100 is provided with noise removed, an occurrence of noise components may be blocked in the induced electromotive force that is generated from the secondary winding coils Ns1 and Ns2 of the first and second planar transformers 130 and 140.

An output device that outputs the reduced voltage of a general converter includes an inductor for removing noise from the output voltage. Since a larger amount of current flows through the output as the rate at which the voltage is reduced, the inductor capable of withstanding the high current should be used. The inductor capable of withstanding the high current may be large in size and may increase component cost.

In contrast, unlike the general converter, when a voltage or a current is provided from the input device receiving the high voltage to the transformer, as the converter according to an embodiment of the present disclosure removes noise and transfers the voltage or the current, the inductor is not required in the output device 20.

Accordingly, a converter according to an embodiment of the present disclosure may reduce the size of the converter and may decrease the component cost, compared to the general converter.

An embodiment of the present disclosure may improve power conversion efficiency and power conversion stability, and may reduce component cost.

An embodiment of the present disclosure may improve fuel efficiency of a vehicle by increasing the power conversion efficiency.

An embodiment of the present disclosure may improve the stability of a vehicle electric system by increasing the power conversion stability.

In addition to this, various effects that are directly or indirectly identified through this document may be provided.

The above description is only illustrative of the technical idea of the present disclosure, and those of ordinary skill in the art to which the present disclosure pertains will be able to make various modifications and variations without departing from the essential characteristics of the present disclosure.

Accordingly, the embodiments disclosed in the present disclosure are not intended to limit the technical idea of the present disclosure, but to explain the technical idea, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

What is claimed is:

1. A converter using a planar transformer comprising:
an input device configured to receive a first voltage;
a transformer including a first planar transformer and a second planar transformer, the transformer configured to reduce the first voltage; and
an output device configured to output the first voltage as a second voltage, wherein the first voltage is greater than the second voltage,
wherein the input device is configured to provide a current to a primary winding coil of each of the first planar transformer and the second planar transformer through a first current path and a second current path in which current directions are different with each other,
wherein the input device includes a plurality of inductors connected in parallel with the primary winding coil of each of the first planar transformer and the second planar transformer,
wherein the plurality of inductors includes a first inductor and a second inductor,
wherein the primary winding coil of the first planar transformer is connected in parallel with the first inductor,
wherein the primary winding coil of the second planar transformer is connected in parallel with the second inductor,
wherein a secondary winding coil of each of the first planar transformer and the second planar transformer is electrically connected to the output device, and
wherein all currents generated by the first current path and the second current path flow through the first inductor and the second inductor.

2. The converter of claim 1, wherein the input device includes:

a switching device including a first switch and a second switch, the switch configured to select one of the first current path or the second current path; and an input regulator configured to remove noise of the current provided to the primary winding coil of each of the first planar transformer and the second planar transformer through the selected first current path or the selected second current path.

3. The converter of claim 2, wherein the input device is configured to:

provide the current to the primary winding coil of the first planar transformer through the first current path when the second switch is turned on.

4. The converter of claim 3, wherein the input regulator includes a first capacitor, a first inductor, a second inductor, and a third inductor, wherein the first current path is a current path that sequentially passes through the first inductor, the second inductor, the third inductor, and the second switch, and wherein the primary winding coil of the first planar transformer is connected in parallel with the second inductor.

5. The converter of claim 2, wherein the input device is configured to:

provide the current to the primary winding coil of the second planar transformer through the second current path when the first switch is turned on.

6. The converter of claim 5, wherein the input regulator includes a first capacitor, a first inductor, a second inductor, and a third inductor, wherein the second current path is a current path that sequentially passes through the third inductor, the second inductor, the first inductor, the first capacitor, and the first switch, and wherein the primary winding coil of the second planar transformer is connected in parallel with the third inductor.

7. The converter of claim 1, wherein the first planar transformer and the second planar transformer include a multilayer circuit board, and an upper core and a lower core that are coupled in a form surrounding the multilayer circuit board, wherein the multilayer circuit board includes a plurality of printed circuit boards, wherein each of the plurality of printed circuit boards includes a winding formed in a spiral pattern, and wherein the upper core and the lower core include a magnetic material.

8. The converter of claim 1, wherein the output device includes:

a rectifier configured to allow a current provided from the secondary winding coils of the first planar transformer and the second planar transformer to flow in one direction; and a filter configured to remove noise from the current flowing through the rectifier.

* * * * *